US012768570B2

(12) United States Patent
Weidacher et al.

(10) Patent No.: US 12,768,570 B2
(45) Date of Patent: Oct. 20, 2026

(54) SOLAR-THERMAL PROCESS TEMPERATURE CONTROL SYSTEM FOR A FILM STRETCHING UNIT

(71) Applicant: BRÜCKNER MASCHINENBAU GMBH, Siegsdorf (DE)

(72) Inventors: Quirin Weidacher, Traunstein (DE); Benjamin Dürr, Traunstein (DE)

(73) Assignee: BRÜCKNER MASCHINENBAU GMBH, Siegsdorf (DE)

(*) Notice: Subject to any disclaimer, the term of this patent is extended or adjusted under 35 U.S.C. 154(b) by 34 days.

(21) Appl. No.: 18/486,718

(22) Filed: Oct. 13, 2023

(65) Prior Publication Data

US 2024/0125517 A1 Apr. 18, 2024

(30) Foreign Application Priority Data

Oct. 14, 2022 (DE) ......................... 102022126925.6

(51) Int. Cl.

| | |
|---|---|
| ***B29C 55/28*** | (2006.01) |
| ***F24S 50/40*** | (2018.01) |
| ***F24S 60/30*** | (2018.01) |
| *F24S 23/70* | (2018.01) |

(52) U.S. Cl.

CPC .............. *F24S 50/40* (2018.05); *B29C 55/28* (2013.01); *F24S 60/30* (2018.05); *F24S 2023/872* (2018.05)

(58) Field of Classification Search

CPC ........ H10N 10/00; H10N 10/13; B29C 55/02; B29C 55/12; B29C 55/16; B29C 55/165

See application file for complete search history.

(56) References Cited

U.S. PATENT DOCUMENTS

| | | | |
|---|---|---|---|
| 4,277,594 A | 7/1981 | Matthews et al. | |
| 5,753,172 A * | 5/1998 | Forrest, Jr. ............ | B29C 55/165 425/174.4 |
| 2012/0111386 A1* | 5/2012 | Bell ....................... | H10N 10/00 700/297 |
| 2015/0176920 A1 | 6/2015 | Vendeirinho | |

FOREIGN PATENT DOCUMENTS

| | | |
|---|---|---|
| CN | 205202225 U | 5/2016 |
| DE | 9417659 U1 | 3/1996 |
| DE | 102010023777 A1 | 12/2011 |
| DE | 202019000308 U1 | 2/2019 |
| JP | H02270534 A | 11/1990 |
| JP | 2005-257140 A | 9/2005 |
| JP | 2015-121397 A | 7/2015 |
| KR | 10-0848865 B1 | 7/2008 |
| WO | 2012110328 A2 | 8/2012 |

OTHER PUBLICATIONS

Search Report for DE102022126925.6, dated Jun. 7, 2023, 2 pages.
Japanese Office Action issued in JP Application No. 2023-177286 dated Mar. 10, 2025.
Translation of Korean Office Action issued in Korean Application No. 10-2023-0136888 dated Feb. 24, 2026.

* cited by examiner

*Primary Examiner* — Thu Khanh T. Nguyen
(74) *Attorney, Agent, or Firm* — Nixon & Vanderhye P.C.

(57) ABSTRACT

A film stretching unit uses a solar-thermal process temperature control system for a film stretching unit. The process temperature control system comprises at least a solar heat generator and a heat storage unit. A heat consumer circuit is connected to the heat storage unit in order to be capable of drawing stored thermal energy to supply a film stretching unit 1 with thermal energy.

14 Claims, 6 Drawing Sheets

1

SOLAR-THERMAL PROCESS TEMPERATURE CONTROL SYSTEM FOR A FILM STRETCHING UNIT

CROSS-REFERENCE TO RELATED APPLICATION

This application claims priority to DE Patent Application No. 102022126925.6 filed Oct. 14, 2022, the entire contents of which are hereby incorporated by reference.

FIELD

The technology herein relates to a solar-thermal process temperature control system for a film stretching unit as well as a corresponding film stretching unit.

BACKGROUND

The manufacture of films and, in particular, the operation of film stretching units on an industrial-scale is linked to a high conversion of energy.

A starting material, typically at least a polymer, is provided in granular and/or powder form for film manufacture and is converted into a film, for example a bi-axially oriented film, in multiple process steps that typically comprise different temperature levels.

The largest energy consumers within this film manufacturing process are usually the drying of the polymer starting material (e.g. granules and/or powder), the extrusion as well as the uni-axial or bi-axial stretching. The stretching occurs, for example, by means of a machine direction orienter (also termed MDO), a transverse direction orienter (also termed TDO) or a simultaneous stretching unit, in which the film is stretched in the transverse direction and the machine direction at the same time.

In film manufacture, the starting material (granules and/or powder) is usually initially fed to one (or multiple) extruder(s). A typical extruder comprises a temperature-controlled (heatable) cylinder, in which one or two plasticising screw(s) can rotate. The object of the screw(s) is to convey the plastic granules (or the plastic powder) as well as the plastic melt formed upstream, to plasticise and homogenise the starting material via shearing (friction) as well as to generate sufficient pressure to press the plastic melt under pressure then continuously through a die opening (extrusion die). Different extrusion dies may be used depending on the type of film manufacture.

In the manufacture of blown film (blown film unit), the plastic melt is pressed via the extruder and/or die, for example, through a (temperature-controlled) tubular die. The resulting molten tube is then blown with air and cooled externally, and if applicable internally, by (defined temperature-controlled) cooling air. The cooled film tube is laid flat and then wound up.

In the manufacture of flat films (also termed flat film extrusion), the plastic melt is formed into a flat film after the extruder typically by means of a (temperature-controlled) slot die. The film formed by means of the slot die (also termed cast film) can be extruded, for example, on a chill roll and then stretched.

In principle, a film can be stretched sequentially or simultaneously. In sequential stretching, the film is initially stretched, for example, in the machine direction and then in the transverse direction. In simultaneous stretching, stretching occurs in the machine direction and the transverse direction at the same time.

The machine direction stretching (MDO step) of the plastic film typically comprises controlling the temperature of the extruded plastic web and guiding the (cast) film over (temperature-controlled) rollers. The plastic web can be stretched in the machine direction by the rollers that rotate at different speeds.

In the case of sequential stretching, the subsequent transverse direction stretching (TDO step) of the plastic film typically comprises controlling the temperature of the extruded plastic web (in an oven) and the subsequent stretching in the transverse direction. To this end, the film is typically gripped and then pulled (stretched) in its width. The bi-axially stretched film can then be wound up.

In simultaneous stretching, the extruded film is initially temperature-controlled and then fed, for example, to a simultaneous stretching unit (e.g. a simultaneous stretching oven). In the simultaneous stretching unit, the film is typically gripped and then pulled (stretched) in its width and length.

In the corresponding oven, as typically used in transverse direction stretching and simultaneous stretching, the film to be stretched is heated before the stretching process and then kept at a predefined temperature in and during the stretching process. Subsequently, the stretched film can be cooled in the oven.

In particular, a lot of thermal energy must be provided for simultaneous stretching, machine direction stretching and transverse direction stretching. Currently, different generation concepts exist for this supply (e.g. electric heating, heating via thermal oil, heat supply via gas burners, and suchlike). In the use of thermal oil, the temperature of the thermal oil is controlled via a heating system, for example, such as an oil, gas or coal boiler. That is, fossil fuels (coal, gas, oil, . . . ) are still predominantly used, which results in the manufactured film having an unfavourable $CO_2$e footprint.

INTRODUCTION OF EXAMPLE EMBODIMENTS

Example technology herein eliminates the aforementioned disadvantages and to reduce the use of fossil fuels in film manufacture, or to even avoid their use. In particular, $CO_2$e emissions are to be reduced.

Such features are provided by a solar-thermal process temperature control system as well as by a film stretching unit and by the application of the process temperature control system in a film stretching unit. Further aspects are described below.

In particular, example embodiments provide a solar-thermal process temperature control system for a film stretching unit. The process temperature control system comprises at least a solar heat generator, which is integrated into a heat generation circuit, wherein the heat generation circuit conveys a first heat transfer fluid.

The solar heat generator converts solar energy into usable thermal energy. In particular, said at least one solar heat generator comprises solar-thermal collectors that focus the incident radiation (e.g. concentrated solar power (CSP) systems) in order to heat the first heat transfer fluid to the maximum possible temperatures.

For example, the solar heat generator can heat the first heat transfer fluid to at least 250° C., to at least 300° C., to at least 400° C., to at least 450° C., to at least 500° C. or to at least 550° C.

Furthermore, the process temperature control system comprises at least one heat storage unit. Thermal energy can be fed to the heat storage unit via the first heat generation circuit, said thermal energy being generated by said at least one solar heat generator. The heat storage unit is thus configured to store thermal energy.

Depending on the construction, the storage medium used, the size of the heat storage unit and the thermal insulation of the heat storage unit, the heat storage unit can be used for short-term heat storage and/or long-term heat storage. A short-term heat storage unit enables the storage of an amount of heat for heating the consumer(s) independently of the sun for a few minutes to up to one hour. By means of a long-term heat storage unit, the consumer(s) can also be heated independently of the sun for several hours (for example, at least 2 hours, at least 3 hours, at least 4 hours, at least 5 hours, at least 6 hours, at least 7 hours, at least 8 hours, at least 9 hours, at least 10 hours, at least 11 hours, or at least 12 hours).

The storage medium that uses the heat storage unit can be the first heat transfer fluid (direct storage) or an intermediate-circuit heat transfer fluid (indirect storage). Similarly, other storage media may be used.

The process temperature control system comprises at least one heat consumer circuit that conveys a second heat transfer fluid. This second heat transfer fluid can differ from the first heat transfer fluid. Similarly, the same heat transfer fluid can be used for the first and the second heat transfer fluids.

The heat consumer circuit is connected to said at least one heat storage unit in order to be capable of drawing stored thermal energy.

In particular, the heat consumer circuit can comprise a supply section and a return section, wherein the consumer(s) can be integrated into the heat consumer circuit between the supply section and the return section so that the temperature of the second heat transfer fluid in the supply section is more than the temperature of the second heat transfer fluid in the return section.

Furthermore, the process temperature control system comprises at least one temperature control device. The temperature control device comprises at least one heat transfer fluid outlet for supplying the consumer(s). The heat transfer fluid outlet is thus arranged between the supply section and the return section.

Said at least one temperature control device is configured to supply the second heat transfer fluid at a defined temperature at said at least one heat transfer fluid outlet (and thus the consumer(s)) in order to supply at least one component of a film stretching unit directly or indirectly with defined temperature-controlled heat transfer fluid. Thus, the film stretching unit can be supplied with thermal energy.

The process temperature control system thus enables the supply of thermal energy to a film stretching unit, said thermal energy being generated by means of at least one solar heat generator. This enables the reduction of $CO_2e$ emissions.

The process temperature control system can furthermore comprise a first heat exchanger. This first heat exchanger can be connected between said at least one heat storage unit and the heat consumer circuit. In particular, the first heat exchanger can be controlled so that the thermal energy transferred from the heat storage unit to the heat consumer circuit can be monitored and/or controlled. For example, the inflow and/or outflow of the heat exchanger can be controlled (for example, the flow rate, the flow volume, . . . ). Thus, the temperature of the second heat transfer fluid can be controlled in the supply section of the heat consumer circuit.

The process temperature control system can furthermore comprise a second heat exchanger. This second heat exchanger can be connected between said at least one heat storage unit and the heat generation circuit. In particular, the second heat exchanger can be controlled so that the thermal energy transferred from the heat generation circuit to the heat storage unit can be monitored and/or controlled. For example, the inflow and/or outflow of the second heat exchanger can be controlled (for example, the flow rate, the flow volume, . . . ). Thus, the temperature of the storage medium can be controlled in the heat storage unit.

In particular, the heat storage unit can be integrated into an intermediate circuit which conveys an intermediate-circuit heat transfer fluid. This intermediate-circuit heat transfer fluid can differ from the first and/or the second heat transfer fluids. Similarly, it is possible that the same heat transfer fluid is used for the first heat transfer fluid and/or the second heat transfer fluid and/or the intermediate-circuit heat transfer fluid.

If different heat transfer fluids are used, the heat transfer fluids can be adapted to the respective requirements. A heat transfer fluid with a very high specific heat capacity can be used, for example, for the heat storage unit to be capable of storing as much energy as possible within a small space. In contrast, heat transfer fluids, which are less viscous and can thus be transported more easily to the heating unit(s) and/or the consumers, can be advantageous for the heat generation circuit and/or the heat consumer circuit. In addition, the boiling points of the heat transfer fluids can be adapted to the respective application temperatures.

Thus, said at least one solar heat generator can be configured to supply the first heat transfer fluid to the heat storage unit or the second heat exchanger at a temperature of at least 250° C. (or at least 300° C., or at least 400° C., or at least 450° C., or at least 500° C. or at least 550° C.). In this case, the first heat transfer fluid can be an oil or a molten salt, whose boiling point is, for example, above the aforementioned temperatures. Similarly, water can be used as the heat transfer fluid, which is evaporated under pressure in the solar heat generator.

The first heat transfer fluid, the second heat transfer fluid and/or the intermediate-circuit heat transfer fluid can be selected from one of the following heat transfer fluids:

water, a thermal oil, or a molten salt, wherein the first heat transfer fluid, the second heat transfer fluid and/or the intermediate-circuit heat transfer fluid may differ. Typically, heat transfer fluids are liquid. However, gaseous heat transfer fluids (e.g., steam or any other suitable gas) can be used, in particular in the heat generator(s).

Said at least one heat storage unit can be configured to store a heat transfer fluid at a temperature of at least 180° C., or at least 210° C. and in particular at least 240° C. For example, the heat storage unit can be configured to store temperatures ranging from 180° C. to 560° C. or from 210° C. to 500° C. or from 240° C. to 400° C. In particular, the temperature of the heat transfer fluid stored in the heat storage unit depends on the dimensions of the heat storage unit (e.g. volumes, geometric size, insulation, . . . ), the type of fluid used and the type of heat storage unit. It is understood that the temperature in the heat storage unit does not have to be distributed evenly and, in particular, different temperature regions may be present.

In particular, the heat storage unit can be a stratified storage unit. In such a stratified storage unit, the storage medium is present in layers at different temperatures, wherein the temperature decreases from top to bottom. This stratified storage unit can thus be connected to the heat consumer circuit with different temperature levels. This enables high amounts of energy to be drawn if this is required.

Said at least one solar heat generator can comprise a linear concentrating solar power generator, in particular at least one parabolic trough collector and/or at least one Fresnel collector.

In the case of parabolic trough collectors, direct solar radiation is concentrated by means of one or more parabolic dishes onto a receiver located in the focus of the parabolic dish(es).

In the case of Fresnel collectors, several primary mirrors are aligned in such a way that they reflect the direct solar radiation onto a centrally mounted receiver. To minimise the accuracy requirements of the primary mirrors, a secondary concentrator (for example a parabolic dish) can be used which focuses the solar rays reflected by the primary mirrors onto the receiver.

The receiver used in parabolic trough collectors or Fresnel collectors comprises, for example, a tube, such as steel tube, which can be surrounded by an evacuated glass tube in order to minimise heat losses. The tube conveys the first heat transfer fluid. The tube can also be coated. In this case, the coating of the tube ensures high absorption of the solar radiation together with emissivity as low as possible in order to minimise heat losses further. The attainable temperature level of the first heat transfer fluid is up to 550° C., or even higher.

Said at least one solar heat generator can be a tracking heat generator, said at least one heat generator can thus track the current position of the sun. To this end, a controller can be provided which determines the current position of the sun itself or contains relevant data. Based on the current position of the sun, actuators can be controlled that bring about the tracking of the solar heat generator(s). In particular, said at least one solar heat generator can comprise single-axis tracking.

In parabolic trough collectors, the parabolic dish(es) can be tracked uni-axially via a servo motor for single-axis tracking. By this means, a high energy yield with less constructional outlay is enabled. In Fresnel collectors, the tracking can take place via the primary mirrors that are variable in position. In particular, several primary mirrors can be grouped into groups and then tracked in groups in order to minimise the control engineering requirements.

Furthermore, the process temperature control system can comprise at least one pump. This pump/these pumps can be integrated in such a way into the process temperature control system to circulate a first heat transfer fluid, a second heat transfer fluid and/or an intermediate-circuit heat transfer fluid. By controlling the pump(s), the flow velocity of the heat transfer fluids can be controlled in the corresponding circuits. Thus, the amount of transferred thermal energy can also be controlled.

In particular, the temperature control device can be configured to mix heat transfer fluid of the supply section with colder heat transfer fluid, for example from the return section, in order to supply the second heat transfer fluid at a defined temperature to said at least one heat transfer fluid outlet. Furthermore or alternatively, the temperature control device can be configured to control at least one pump of the process temperature control system in order to control the flow velocity of the corresponding heat transfer fluid in the circuit allocated to the pump. By controlling the pump(s), the second heat transfer fluid can be supplied at a defined temperature to said at least one heat transfer fluid outlet.

To this end, at least one controllable pump can be located in the heat generation circuit and/or at least one controllable pump in the intermediate circuit and/or at least one controllable pump in the heat consumer circuit.

Furthermore, the process temperature control system can comprise at least one additional heating device. Said at least one additional heating device can be allocated to the heat consumer circuit, in particular the supply section and/or the heat storage unit. The additional heating device can compensate for fluctuations in the generation of solar heat, in particular naturally occurring fluctuations (day/night, weather, . . . ), and/or can increase the temperature level to a required temperature level.

The additional heating device can be an electric additional heating device or can be based on other energy sources, such as coal, oil, gas, pellets, chips and/or suchlike. If the additional heating device, for example, is allocated to the heat storage unit, this can be an electric heating blade, which controls the temperature of the corresponding heat transfer fluid directly.

Furthermore, the process temperature control system can comprise at least one supply manifold that is downstream said at least one consumer outlet. This supply manifold is configured to distribute the second heat transfer fluid to different consumers of a film stretching unit. Thus, different consumers, such as the extruder, machine direction orienter (MDO), transverse direction orienter (TDO) and/or suchlike, can be supplied with thermal energy.

In addition, the process temperature control system comprises at least one return collector and one distributing device. The return collector takes the returning second heat transfer fluid from at least one consumer and supplies this to the distributing device. The distributing device is configured to supply the heat transfer fluid to the heat storage unit, the first heat exchanger and/or the temperature control device. The distributing device can be static. Similarly, the distributing device can be controlled in order to control the corresponding volumetric flow rate. To this end, corresponding valves can be provided.

The object is also solved by a film stretching unit which comprises the process temperature control system described previously as well as at least one of the following components:

- a drying apparatus for drying the starting material, such as polymer granules and/or polymer powder;
- a feed hopper, which can be temperature-controlled and used to supply the starting material for the film manufacture to an extruder;
- an extruder, which can be temperature-controlled and which plasticises the starting material and delivers it as a plastic web or (cast) film to a chill roll;
- a blown film unit, which can be temperature-controlled and which is configured to manufacture a blown film;
- a chill roll, which can be temperature-controlled and which is configured to control the temperature of the extruded plastic web (cast film);
- a machine direction orienter, which can be temperature-controlled and which is configured to stretch an extruded plastic web and/or a blown film in the machine direction;
- a transverse direction orienter, which can be temperature-controlled and which is configured to stretch an extruded plastic web and/or a blown film in the transverse direction;

- a simultaneous stretching unit, which can be temperature-controlled and which is configured to stretch an extruded plastic web and/or a blown film simultaneously in the machine direction and the transverse direction;
- a pull-roll device, which can be temperature-controlled and which is configured to determine the film thickness and/or to subject the film to a surface treatment;
- a wrapping device, which can be temperature-controlled and is configured to wind the film in rolls; and/or
- an absorption cooling machine for process temperature control, in particular for process cooling.

The film stretching unit is configured in such a way that at least one of the components is supplied with thermal energy directly or indirectly by means of the process temperature control system in order to be temperature-controlled in a defined manner. It is understood that the aforementioned components of a film stretching unit can be temperature-controlled as such and/or corresponding subassemblies of these (such as rollers, housings, housing sections and/or suchlike) can be temperature-controlled.

Thus, the film stretching unit, but in any case at least one component (or subassembly of the component) of the film stretching unit, can be supplied with solar-powered thermal energy so that fossil fuels required to date can be substituted. This results in an improvement in the $CO_2e$ emissions balance of the film manufacture.

Exemplary subassemblies of the components are temperature-controlled rollers, temperature-controlled housings, temperature-controlled housing sections and suchlike. The subassemblies can be supplied with heat transfer fluid and thermal energy directly or indirectly.

In particular, at least one of the components of the film stretching unit can be connected to the heat transfer fluid outlet in order to be supplied directly with heat transfer fluid. In the case of direct supply, the heat transfer fluid can be conveyed from the heat transfer fluid outlet directly to the corresponding component (or subassembly of it). For example, a roller guiding the film can have heat transfer fluid flowing through it and can therefore be temperature-controlled.

Exemplary rollers are the chill roll, roller(s) allocated to the machine direction orienter (such as preheating roller(s), stretch roller(s), annealing rollers(s), and/or suchlike), roller(s) of the pull-roll device and/or roller(s) of the wrapping device.

Similarly, temperature-controlled heat transfer fluid can flow directly through parts of the drying apparatus (in particular a housing part and/or a mixer, . . . ), the feed hopper, the extruder (in particular a screw and/or a cylinder, or another housing part), housing (parts) of the stretching unit(s) and/or the absorption cooling machine.

In the case of indirect supply, the heat transfer fluid is supplied to a heat exchanger allocated to the respective component (or subassembly). For example, the heat transfer fluid can be conveyed through a heat exchanger, through which a temperature-control medium (such as air) is flowed or blown in to control the temperature of a housing or housing section of a component (in particular a machine direction orienter, transverse direction orienter and/or simultaneous stretching unit). This temperature-control medium can be introduced into the housing or the housing section to be temperature-controlled.

In particular, the film stretching unit can comprise one or more nozzle boxes, by means of which air is blown into different temperature zones or housing sections of the stretching unit. Such nozzle boxes are used in particular as subassemblies of transverse direction orienters and/or simultaneous stretching units in order to control the temperature of the film there as exactly as possible. Said at least one nozzle box can be temperature-controlled by means of the heat transfer fluid provided by the process temperature control system.

The film stretching unit can furthermore comprise at least one additional heating device, wherein the additional heating device is configured to supply additional thermal energy to at least one of the components of the film stretching unit.

The additional heating device can compensate for fluctuations in the generation of solar heat, in particular naturally occurring fluctuations (day/night, weather, . . . ), and/or can increase the temperature level of the corresponding component to a required temperature level. In addition, this additional heating device enables the provision of a thermal base level by means of the process temperature control system. If higher temperatures are required at one (or more) components, the additional heating device can supply the thermal energy additionally required in order to attain and/or maintain the required temperature level.

Example embodiments also provide application of the process temperature control system described previously in a film stretching unit described previously, wherein the process temperature control system supplies at least one of the components of the film stretching unit (in particular a subassembly of it) directly or indirectly with thermal energy in order to control its temperature in a defined manner.

BRIEF DESCRIPTION OF THE DRAWINGS

The attached figures show aspects of example embodiments. In particular.

DETAILED DESCRIPTION OF EXAMPLE EMBODIMENTS

Figure 1:
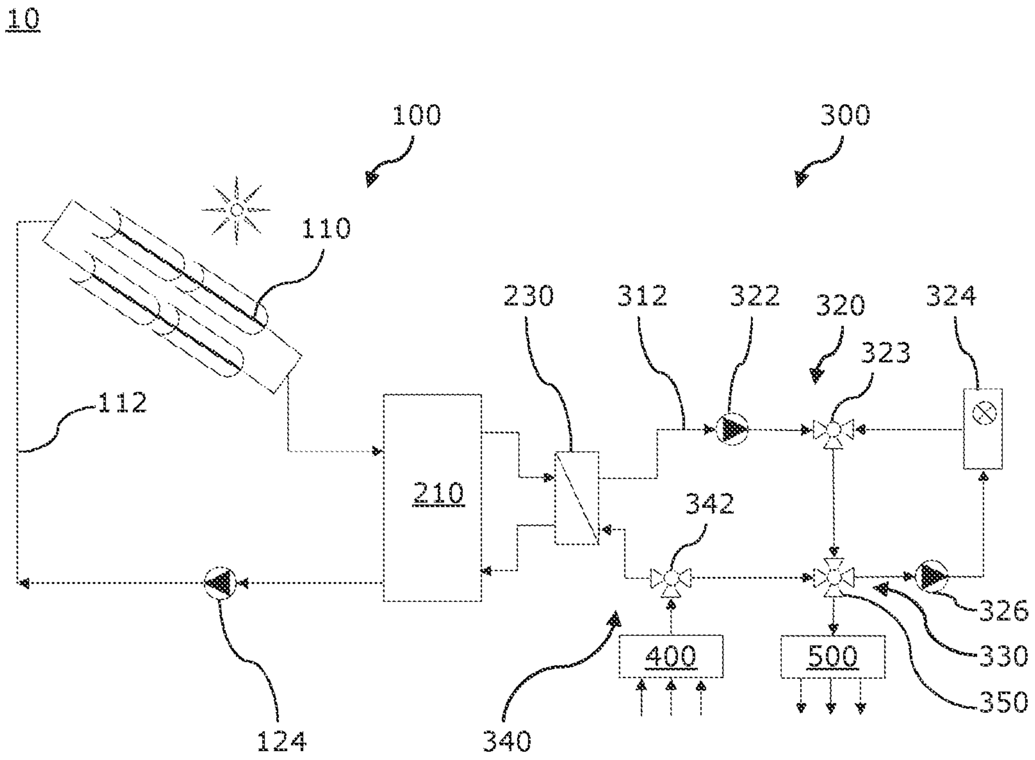
FIG. 1 shows a schematic view of a process temperature control system comprising direct heat storage.

In particular, FIG. 1 shows a schematic view of a process temperature control system 10 comprising direct heat storage.

The process temperature control system 10 comprises a heat generation circuit 100. A solar heat generator 110, in particular a concentrated solar power CSP heating unit, such a parabolic trough collector, is integrated into this heat generation circuit 100. This solar heat generator 110 can convert solar radiation into usable thermal energy. The first heat transfer fluid 112 is conveyed for this purpose in the heat generation circuit 100 and heated by means of the solar heat generator 110, for example, to approx. 550° C. A pump 124, which is allocated to the heat generation circuit 100, can circulate the first heat transfer fluid 112 (for example water, steam, thermal oil, molten salt, . . . ).

Furthermore, the process temperature control system 10 comprises at least one heat storage unit 210. Thermal energy for storage can be supplied to the heat storage unit 210 via the first heat generation circuit 100, said thermal energy being generated by said at least one solar heat generator 110. In the embodiment shown here, the heat storage unit 210 takes the first heat transfer fluid 112. The storage medium is therefore the first heat transfer fluid so that the thermal energy is stored directly.

Via a heat exchanger 230, a heat consumer circuit 300 conveying a second heat transport fluid 312 is connected to the heat storage unit 210. Thus, thermal energy can be drawn from the heat storage unit 210. The heat exchanger 230 can be arranged outside of the heat exchanger as shown in FIG. 1. It is also possible to arrange the heat exchanger within the heat storage unit. The heat exchanger can be a plate heat exchanger, a tubular heat exchanger and/or suchlike. This heat exchanger can be powered by direct current, alternating current or cross current.

The heat consumer circuit 300 comprises a supply section 320 and a return section 340, wherein the temperature of the second heat transfer fluid 312 is higher in the supply section 320 than in the return section 340. Furthermore, the heat consumer circuit 300 comprises at least one temperature control device 330. This temperature control device 330 comprises at least one heat transfer fluid outlet 350 that is connected to a supply manifold 500.

Figure 5:
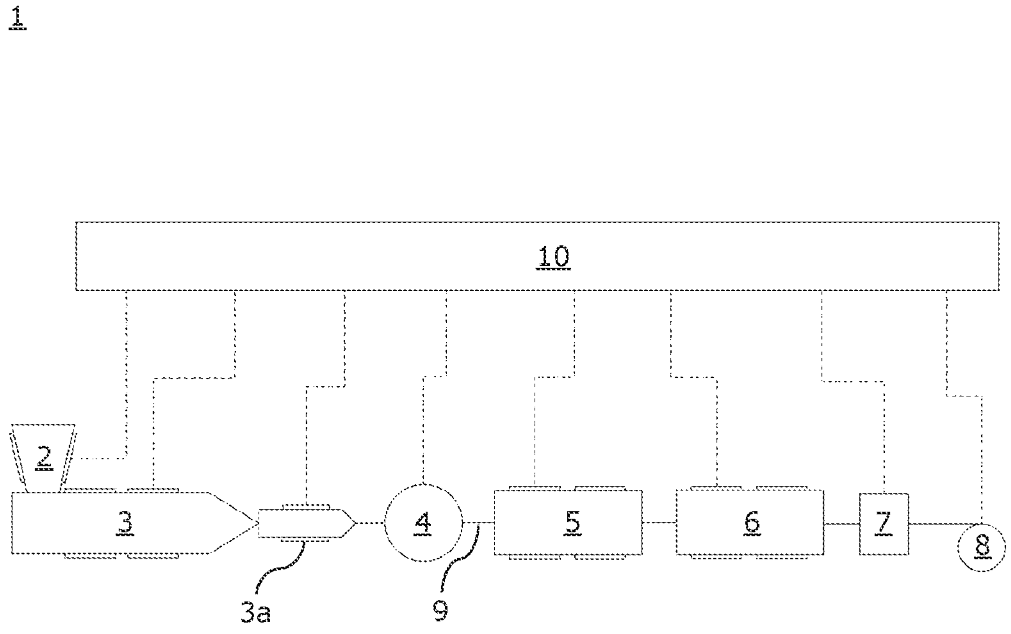
FIG. 5 shows a schematic view of a film stretching unit.

This supply manifold 500 is configured to distribute the second heat transfer fluid 312 to different consumers (components) of a film stretching unit 1 (see FIG. 5). Thus, different consumers, such as the extruder, machine direction orienter (MDO), transverse direction orienter (TDO) and suchlike, can be supplied with thermal energy. If only one consumer is to be supplied with heat transfer fluid 312, this can be connected to the heat transfer fluid outlet 350. The supply manifold 500 is thus optional. Accordingly, the return collector 400 is also optional, for example, if the heat transfer fluid 312 is returned from only one consumer.

To control the temperature as exactly as possible, the temperature control device 330 is configured to mix the second heat transfer fluid 312 of the supply section 320 and the second heat transfer fluid 312 of the return section 340 in such a way to provide the second heat transfer fluid 312 at a defined temperature at said at least one heat transfer fluid outlet 350.

The process temperature control system 10 from FIG. 1 also comprises at least one return collector 400 and one distributing device 342. The return collector 400 takes the returning second heat transfer fluid 312 from at least one consumer of the film stretching unit and supplies this to the distributing device 342. The distributing device 342 then supplies the returning second heat transfer fluid 312 to the heat exchanger 230. There, it can absorb thermal energy from the heat storage unit 210 again and be conveyed to the supply section 320.

In particular, pumps 322, 326, which convey or circulate the second heat transfer fluid 312, can be provided in the heat consumer circuit 300. Similarly, these can be controllable by means of the temperature control device 330.

Furthermore, the process temperature control system 10 comprises at least one additional heating device 324 that is integrated into the heat consumer circuit 300. Thus, additional thermal energy can be provided if this is required. Via the controllable valve 323, heat transfer fluid 312 can be conveyed to the additional heating device 324 and thus be heated additionally. The controllable valve 323 can be a proportional valve which allows the flow volume to be controlled. In particular, the valve 323 can be controlled by means of the temperature control device 330.

Figure 2:
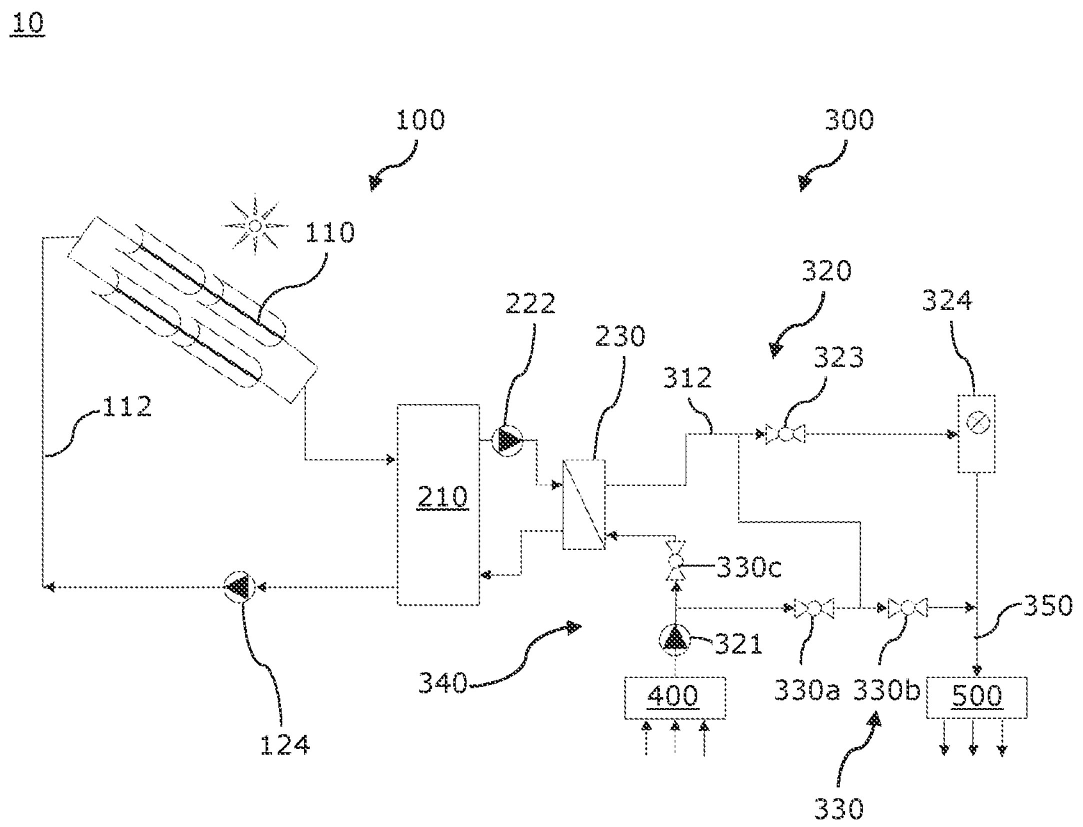
FIG. 2 shows a schematic view of a process temperature control system comprising direct heat storage.

FIG. 2 shows a schematic view of a further process temperature control system 10 comprising direct heat storage. This process temperature control system 10 differs from the process temperature control system 10 shown in FIG. 1, in particular in the way in which the heat consumer circuit 300 is designed.

The heat consumer circuit 300 of the process temperature control system 10 shown in FIG. 2 comprises a supply section 320 and a return section 340, wherein the temperature of the second heat transfer fluid 312 is higher in the supply section 320 than in the return section 340.

Furthermore, the heat consumer circuit 300 comprises at least one temperature control device 330. This temperature control device 330 comprises at least one heat transfer fluid outlet 350 that is connected to a supply manifold 500.

This supply manifold 500 is configured to distribute the second heat transfer fluid 312 to different consumers (components) of a film stretching unit 1 (see FIG. 5). Thus, different consumers, such as the extruder, machine direction orienter (MDO), transverse direction orienter (TDO) and suchlike, can be supplied with thermal energy. If only one consumer is to be supplied with heat transfer fluid 312, this can be connected to the heat transfer fluid outlet 350. The supply manifold 500 is thus optional. Accordingly, the return collector 400 is also optional, for example, if the heat transfer fluid 312 is returned from only one consumer.

To control the temperature as exactly as possible, the temperature control device 330 is configured to mix the second heat transfer fluid 312 of the supply section 320 and the second heat transfer fluid 312 of the return section 340 in such a way to supply the second heat transfer fluid 312 at a defined temperature at said at least one heat transfer fluid outlet 350. To this end, the valves 330*a*, 330*b* and 330*c* are provided.

Furthermore, the process temperature control system 10 from FIG. 2 comprises at least one return collector 400. The return collector 400 takes the returning second heat transfer fluid 312 from at least one consumer of the film stretching unit and supplies this, among other things, to the valve 330*a* and the value 330*c*. Via the valve 330*c*, the returning second heat transfer fluid 312 can be conveyed to the heat exchanger 230. There, it can absorb thermal energy from the heat storage unit 210 again and be conveyed to the supply section 320.

The valves 330*a*, 330*b* and 330*c* can be controllable valves that are controlled by the temperature control device 330. In particular, the valves 330*a*, 330*b* and 330*c* can be proportional valves which allow the flow volume to be controlled. By means of the targeted control of the valves 330*a*, 330*b* and 330*c*, the heat transfer fluid 312 can be mixed and supplied at a defined temperature to the heat exchanger 210 and/or the heat transfer fluid outlet 350.

In particular, a pump 321 can be provided in the heat consumer circuit 300 that conveys or circulates the second heat transfer fluid 312. Optionally, a pump 222 can also be provided between the heat storage unit 210 and the heat exchanger 230 for conveying the corresponding heat transfer fluid. These pumps 321, 222 can also be controllable by means of the temperature control device 330.

Furthermore, the process temperature control system 10 comprises at least one additional heating device 324 that is integrated into the heat consumer circuit 300. Thus, additional thermal energy can be provided if this is required. Via a controllable valve 323, heat transfer fluid 312 can be conveyed to the additional heating device 324 and thus heated additionally. The controllable valve 323 can be a proportional valve which allows the flow volume to be controlled. In particular, the valve 323 can be controlled by means of the temperature control device 330.

Figure 3:
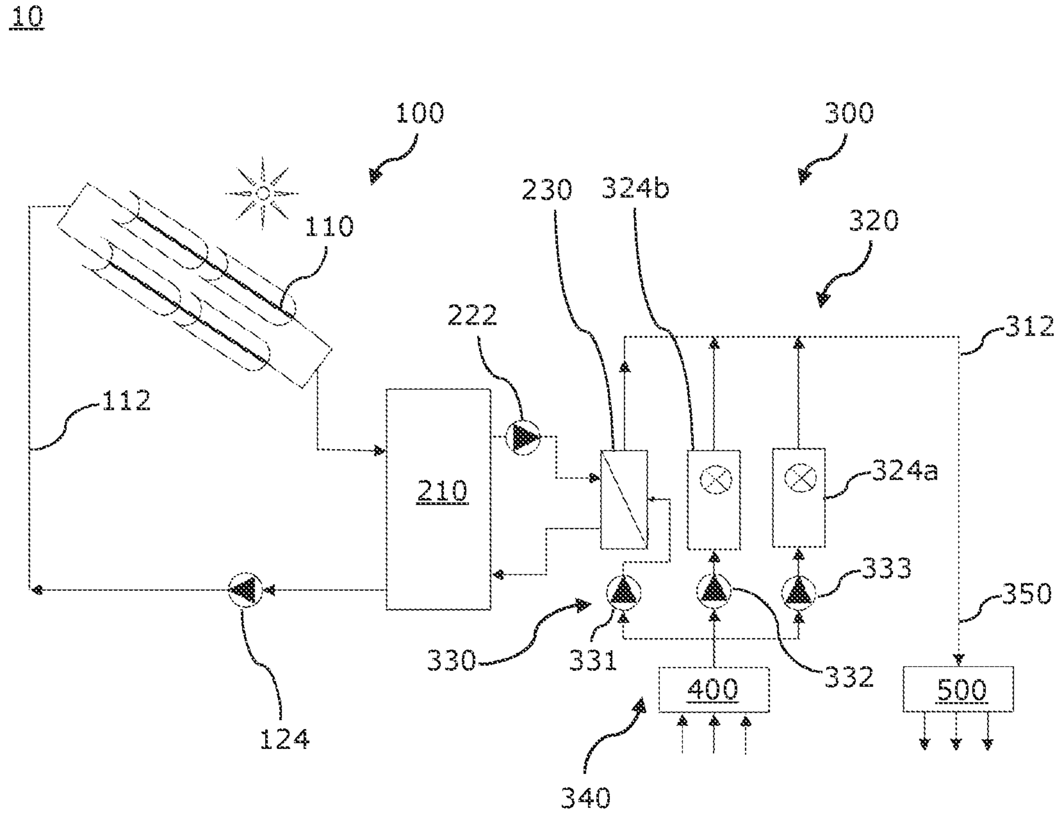
FIG. 3 shows a schematic view of a process temperature control system comprising direct heat storage.

FIG. 3 shows a schematic view of a further process temperature control system 10 comprising direct heat storage. This process temperature control system 10 differs from the process temperature control systems shown in FIGS. 1 and 2, in particular in the way in which the heat consumer circuit 300 is designed.

A pump 222 conveys heat transfer fluid from the heat storage unit 210 to the heat exchanger 230. The pump 331 is upstream of the heat exchanger 230. Furthermore, the heat consumer circuit 300 comprises multiple (for example two here) additional heating devices 324*a*, 324*b* that are connected parallel to the heat exchanger 230. In each case, a pump 332, 333 is upstream of the additional heating devices 324*a*, 324*b*.

The return collector 400 takes the returning second heat transfer fluid 312 from at least one consumer of the film stretching unit and supplies this to the pumps 331, 332, 333.

These pumps 222, 331, 332, 333 can be controlled by means of the temperature control device 330 in order to control the flow velocity of the corresponding heat transfer fluid in the circuit allocated to the pump. By means of the pump 222, the flow velocity of the heat transfer fluid allocated to the heat storage unit 210 can be controlled in the heat exchanger 230. By means of the pump 331, the flow velocity of the heat transfer fluid 312 can be controlled in the heat exchanger 230. Thus, the amount of thermal energy to be drawn from the heat storage unit 210 via the pump(s) 222 and/or 331 can be controlled.

Via the pumps 332 and 333, the flow velocity of the heat transfer fluid 312 can be controlled in the additional heating devices 324*a*, 324*b*. Thus, the amount of thermal energy transferred to the heat transfer fluid 312 can also be controlled here.

After the heat transfer fluid 312 has passed the branches of the additional heating device(s) 324*a*, 324*b* and/or the heat exchanger 230, the branches are mixed and supplied to the heat transfer fluid outlet 350 or the supply manifold 500. As already described above, the supply manifold 500 is optional and can be omitted if only one consumer is to be supplied with heat transfer fluid 312. Accordingly, the return collector 400 is also optional, for example, if the heat transfer fluid 312 is returned from only one consumer.

Figure 4:
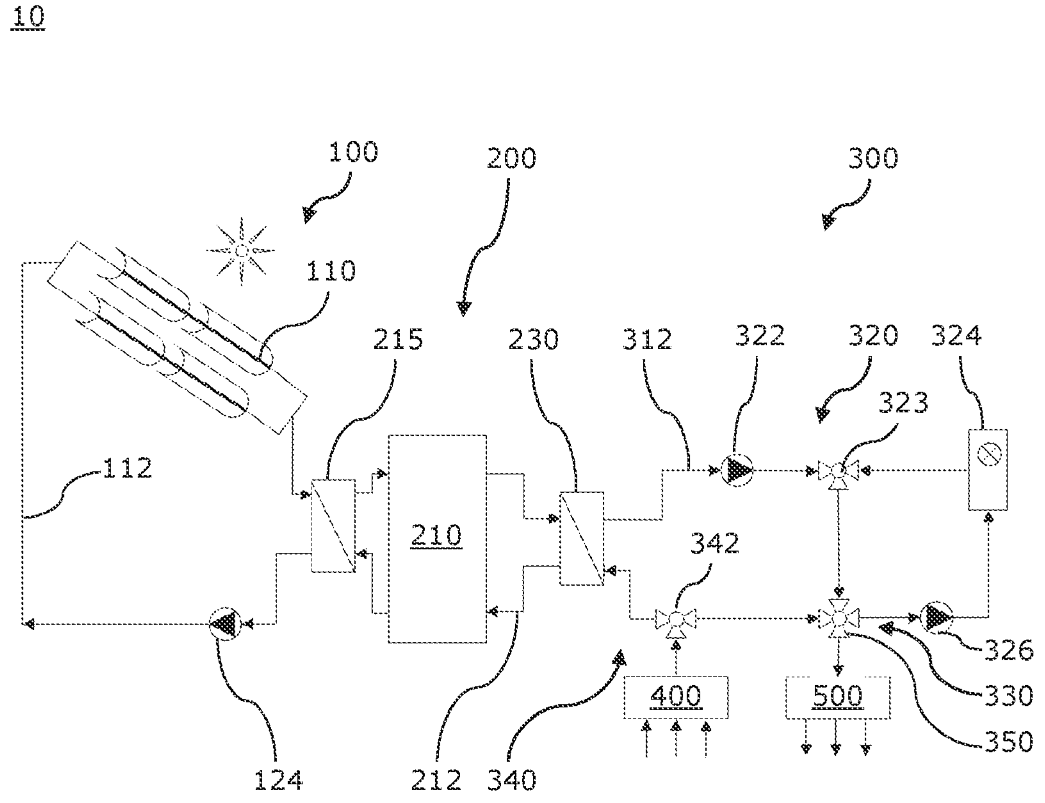
FIG. 4 shows a schematic view of a process temperature control system comprising indirect heat storage.

FIG. 4 shows a schematic view of a process temperature control system 10 comprising indirect heat storage. This process temperature control system 10 differs from the process temperature control system 10 shown in FIG. 1, in particular in way in which the heat storage unit 210 is integrated into the process temperature control system 10. In the system shown in FIG. 4, the first heat transfer fluid 212 is not conveyed directly into the heat storage unit 210 but conveyed through a heat exchanger 215. This heat exchanger 215 is integrated into an intermediate circuit 200, in which the heat exchanger 210 is also integrated. The intermediate circuit 200 conveys an intermediate-circuit heat transfer fluid 212. This intermediate-circuit heat transfer fluid 212 can differ from the first heat transfer fluid 112 and/or the second heat transfer fluid 312.

The energy generated by the solar heat generator 110 is initially transferred to the first heat transfer fluid 112 (in the solar heat generator 110) and then transferred to the intermediate-circuit heat transfer fluid 212 in the heat exchanger 215 for storage, in order to be stored in the heat storage unit 210 (indirect storage).

FIG. 5 shows a schematic view, in very simplified form, of a film stretching unit 1, which is configured for bi-axial stretching of a film 9. This film stretching unit 1 comprises several components that constitute the individual process steps of the film manufacture. In particular, the film stretching unit 1 is configured for sequential bi-axial stretching of the film 9.

The starting material to be processed, i.e. a polymer (granules and/or powder), is initially supplied to an extruder 3 via a proportioner comprising a feed hopper 2 and is melted in the extruder 3.

By means of a nozzle unit 3*a* (for example a slot die) that is downstream of the extruder(s) 3, the polymer melt is applied to a chill roll 4 and cooled. The film 9 formed as a result is then stretched by means of a machine direction orienter (MDO) 5 in the machine direction, i.e. longitudinally. Materially and depending on the process, this machine direction stretching occurs at a temperature range of approx. 80° C. to approx. 140° C.

Subsequently, the film is fed into a transverse direction orienter (TDO) 6 and stretched here in the transverse direction. The stretching is described again in detail with regard to FIG. 6. Materially and depending on the process, this transverse direction stretching occurs at a temperature range of approx. 80° C. to approx. 200° C., wherein the temperature range for stretching depends on the material. For PA, PET and PP films, this temperature range is approx. 80°-200° C. The oven of the transverse direction orienter (TDO) can be temperature-controlled at a higher level, for example at a range from 80° to 240° C.

Then, the film 9 is drawn out of the oven by means of a pull-roll device 7 (what is termed a pull roll) and subsequently wound by means of the wrapping device 8.

Similarly, the stretching does not have to occur sequentially, but may occur simultaneously. The difference between simultaneous and sequential stretching is that in simultaneous stretching the film is stretched in the machine direction (longitudinal direction) and the transverse direction at the same time. This occurs in what is termed a simultaneous stretching unit (e.g. a simultaneous stretching oven). The simultaneous stretching unit is temperature controlled and accelerates a gripped film in such a way that this film is stretched simultaneously in the machine direction and in the transverse direction. A separate machine direction orienter is therefore not required.

By means of a process temperature control system 10 described previously (see FIG. 1, 2, 3 or 4), the individual components (for example the feed hopper 2, the extruder 3, the chill roll 4, the machine direction orienter (MDO) 5, the transverse direction orienter (TDO) 6, the pull-roll device 7 and/or wrapping device 8) can be temperature-controlled. Thus, solar energy can be used for film manufacture and the use of fossil fuels can be reduced.

The following example illustrates this. A solar heat generator is assumed that comprises linear Fresnel collectors. In the case of the solar heat generator amounting to 5000 $m^2$, approx. 3,520 MWh thermal energy is yielded at a temperature level of the heat transfer fluid of approx. 250° C. for an average direct normal irradiance (DNI) of 340 $W/m^2$. At a total annual heat requirement of approx. 15,000 MWh for the TDO and MDO devices, which currently are supplied by the fossil fuel coal, this equals 23% or 1.471 $tCO_2e$.

As the above example demonstrates, using concentrated solar power contains significant energy savings potential in the case of heat generation for a film stretching unit.

Figure 6:
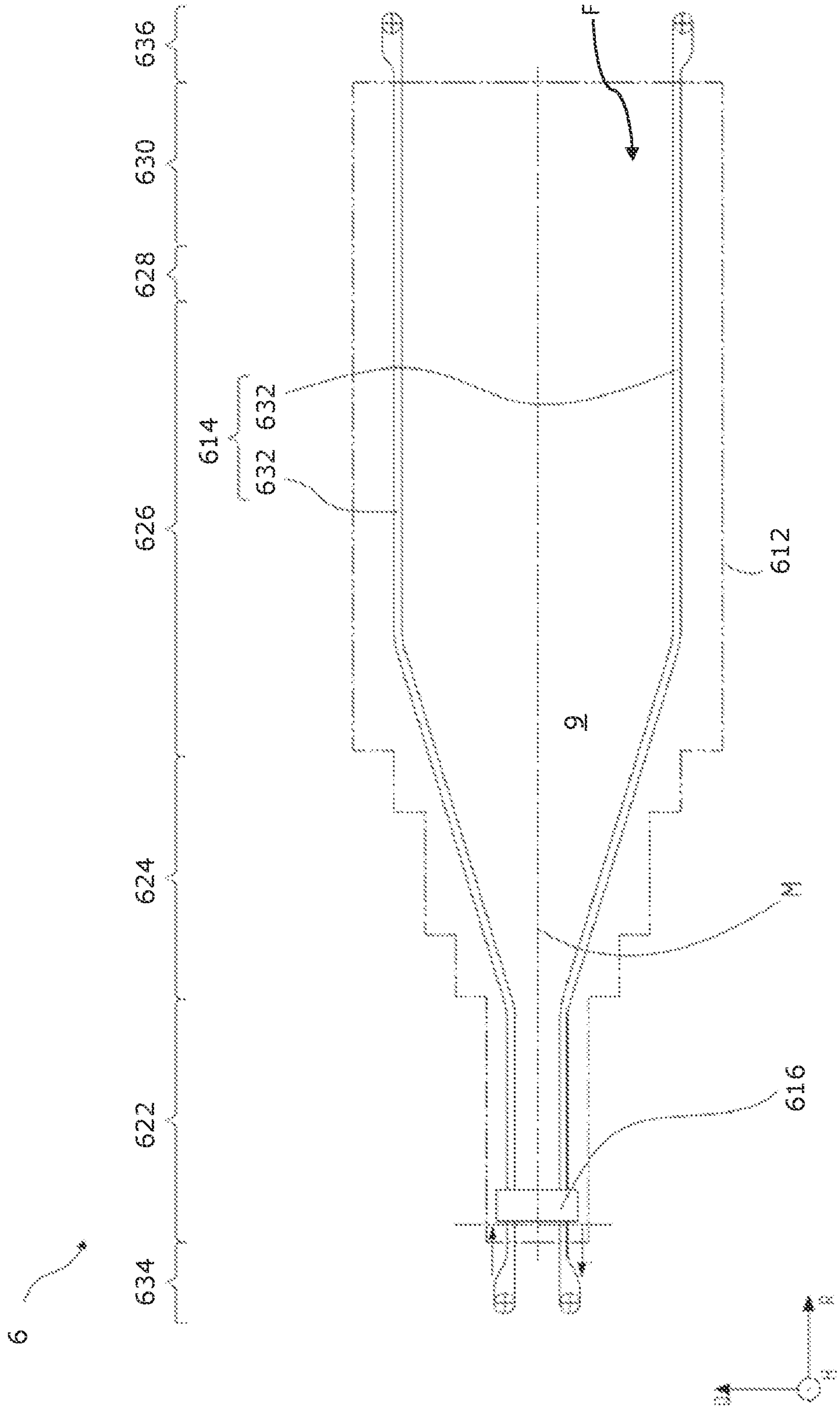
FIG. 6 shows a schematic view of a transverse direction orienter (TDO).

FIG. 6 shows a schematic view of a transverse direction orienter (TDO). It is also conceivable that the stretching unit is a simultaneous stretching unit. The transverse direction orienter 6 comprises an oven 612, a transport system 614 as well as a compensation device 616.

The oven 612 has a drawing direction R that is the direction of travel of the film 9 to be stretched. The transverse direction Q of the oven 612 runs transverse to the drawing direction R as well as horizontally and the vertical direction H runs vertically.

The oven 612 has different zones along the drawing direction R for treating the film 9 to be stretched.

In the first zone 622, also termed preheating zone, the film is heated. In the following second zone 624 ("stretching zone"), the film is stretched in the transverse direction Q so that it has a larger width at the end of the second zone 624 than at the start.

After the stretching is completed, the film 9 then passes through a third zone 626 (termed "heat treatment zone", "further heating zone" and/or "annealing zone"), in which a relaxation of the film 9 can occur at high temperatures.

Then, the film 9 passes through a fourth zone 628 and a fifth zone 630 ("cooling zone"), wherein the film is cooled in the fifth zone 630.

The fourth zone 628 is termed the neutral zone and is used to separate the third zone 626 from the fifth zone 630. The neutral zone is, for example, an empty space without ventilation.

The transport system 614 comprises, in a known manner, two transport rails 632 that are located mirror-symmetrically in respect to a central plane M of the stretching unit 6 and the oven 612 as well as extend at least in part into the oven 612.

In an entry zone 634 as well as an exit zone 636, in which the film to be stretched of the stretching unit 6 is fed and removed, the transport rails 632 run outside of the oven 612.

The film 9 is gripped in the known manner by grippers (not shown) of the transport system 614, which are guided along the transport rails 632, and transported through the oven 612 in the drawing direction R. The film runs in a film track F that is defined in the oven 612 by the transport system 614. The film track F intersects the central plane M.

In particular, the zones 634, 622, 624, 626, 628, 630 and 636 of the oven 612 can be temperature-controlled in a defined manner by means of the process temperature control system 10.

In addition, several nozzle boxes (not shown) are located in the oven 612 that convey the hot (temperature-controlled) air in the direction of the film web F. By means of the hot air, the interior of the oven and thus the film 9 is heated, cooled or kept at a predefined temperature. The air can be temperature-controlled via a suitable heat exchanger of the transverse direction orienter by means of the process temperature control system 10.

LIST OF REFERENCE SIGNS

1 film stretching unit
2 feed hopper
3 extruder
4 chill roll
5 machine direction orienter (MDO)
6 transverse direction orienter (TDO)
7 pull-roll device
8 wrapping device
9 film
10 process temperature control system
100 heat generation circuit
110 solar heat generator
112 first heat transfer fluid

124 pump
200 intermediate circuit
210 heat storage unit (buffer storage)
212 intermediate-circuit heat transfer fluid
215 heat exchanger (generator side)
222 pump
230 heat exchanger (consumer side)
300 heat consumer circuit
312 second heat transfer fluid
320 supply section
322 pump
321 pump
323 valve (for additional heating)
324 additional heating device
**324*a*** additional heating device
**324*b*** additional heating device
326 pump
330 temperature control device
**330*a*** valve
**330*b*** valve
**330*c*** valve
331 pump
332 pump
333 pump
340 return section
342 distributing device
350 heat transport fluid outlet
400 return collector
500 supply manifold
612 oven
614 transport system
616 compensation device
622 preheating zone
624 stretching zone
626 heat treatment zone, further heating zone and/or annealing zone
628 neutral zone
630 cooling zone
632 transport rail
634 entry zone
636 exit zone
H vertical direction of the oven 612
Q transverse direction of the oven 612
R drawing direction
M central plane of the transverse direction orienter

The invention claimed is:

1. In a film stretcher comprising:

a solar-thermal process temperature control system, and at least one component comprising:

a drying apparatus, and/or
a feed hopper, and/or
an extruder, and/or
a blown film unit, and/or
a chill roll, and/or
a machine direction orienter, and/or
a transverse direction orienter, and/or
a simultaneous stretching unit, and/or
a pull-roll device, and/or
a wrapping device, and/or
an absorption cooling machine, wherein the solar-thermal process temperature control system is configured to indirectly supply the at least one component with thermal energy through a heat exchanger in order to temperature-control the at least one component in a defined manner, the solar-thermal process temperature control system comprising:

at least one solar heat generator integrated into a heat generation circuit, wherein the heat generation circuit conveys a first heat transfer fluid;

at least one heat storage, to which thermal energy is supplied via the heat generation circuit, said thermal energy having been generated by the at least one solar heat generator, wherein the at least one heat storage is configured to store the thermal energy;

at least one heat consumer circuit, which conveys a second heat transfer fluid the heat exchanger connected between the at least one heat storage and the at least one heat consumer circuit, the heat exchanger configured to flow or blow a medium to control the temperature of a housing or housing section of the at least one component, wherein the heat consumer circuit is thermally coupled to the at least one heat storage in order to be capable of drawing stored thermal energy, and at least one temperature control device comprising at least one heat transfer fluid outlet, the at least one temperature control device configured to supply the second heat transfer fluid at a defined temperature to said at least one heat transfer fluid outlet in order to supply at least one component of the film stretcher directly or indirectly with defined temperature-controlled heat transfer fluid.

2. Solar-thermal process temperature control system according to claim 1, further comprising a further heat exchanger that is connected between said at least one heat storage and the heat generation circuit.

3. Solar-thermal process temperature control system according to claim 1, wherein the at least one heat storage is integrated into an intermediate circuit that conveys an intermediate-circuit heat transfer fluid.

4. Solar-thermal process temperature control system according to claim 3, wherein said at least one solar heat generator is configured to supply the first heat transfer fluid at a temperature of at least 550° C. to the heat storage or the further heat exchanger.

5. Solar-thermal process temperature control system according to claim 3, wherein the first heat transfer fluid, the second heat transfer fluid and/or the intermediate-circuit heat transfer fluid is selected from the following heat transfer fluids:

water, a thermal oil, or a molten salt, wherein the first heat transfer fluid, the second heat transfer fluid and/or the intermediate-circuit heat transfer fluid may differ.

6. Solar-thermal process temperature control system according to claim 1, wherein said at least one heat storage is configured to store a heat transfer fluid at a temperature of at least 180° C., or at least 210° C. and in particular at least 240° C.

7. Solar-thermal process temperature control system according to claim 1, wherein said at least one solar heat generator comprises a linear concentrating solar power generator, the linear concentrating solar power generator comprising at least one parabolic trough collector and/or at least one Fresnel collector.

8. Solar-thermal process temperature control system according to claim 1, wherein said at least one solar heat generator is a tracking heating generator that comprises at least one single-axis tracking.

9. Solar-thermal process temperature control system according to claim 1, further comprising at least one pump, which is integrated into the process temperature control system in such a way to circulate the first heat transfer fluid, second heat transfer fluid and/or intermediate-circuit heat transfer fluid.

10. Solar-thermal process temperature control system according to claim 1, wherein the heat consumer circuit comprises a supply section and a return section, wherein the temperature control device is configured to mix heat transfer fluid of the supply section with colder heat transfer fluid, for example from the return section, in order to supply the second heat transfer fluid at a defined temperature to said at least one heat transfer fluid outlet, and/or wherein the temperature control device is configured to activate at least one pump of the process temperature control system in order to control flow velocity of the corresponding heat transfer fluid in a circuit allocated to the pump in order to supply the second heat transfer fluid at a defined temperature to said at least one heat transfer fluid outlet.

11. Solar-thermal process temperature control system according to claim 10, further comprising at least one additional heating device, wherein said at least one additional heating device is allocated to the heat consumer circuit, in particular the supply section, and/or the heat storage.

12. Solar-thermal process temperature control system according to claim 1, further comprising at least one supply manifold that is connected downstream of the heat transfer fluid outlet and is configured to distribute the second heat transfer fluid to different consumers of a film stretching unit.

13. Solar-thermal process temperature control system according to claim 1, further comprising at least one return collector and a distributing device, wherein the return collector takes the second heat transfer fluid from at least one consumer and supplies it to the distributing device, wherein the distributing device is configured to supply the second heat transfer fluid to the heat storage, the first-mentioned heat exchanger and/or the temperature control device.

14. The solar-thermal process temperature control system of claim 1 wherein the at least one heat consumer circuit comprises a supply section and a return section.

* * * * *